United States Patent [19]

Andersen

[11] Patent Number: 4,914,640

[45] Date of Patent: Apr. 3, 1990

[54] MEANS FOR IMPROVING TURNAROUND TIME STABILITY FOR R-C ENERGY DETECTORS

[75] Inventor: Victor A. Andersen, North Darmouth, Mass.

[73] Assignee: The United States of America as represented by the Secretary of the Navy, Washington, D.C.

[21] Appl. No.: 308,910

[22] Filed: Feb. 3, 1989

[51] Int. Cl.$^4$ .............................................. G01S 15/00
[52] U.S. Cl. ...................................... 367/98; 367/901
[58] Field of Search .................. 367/98, 901; 364/517; 73/609

[56] References Cited

U.S. PATENT DOCUMENTS 4,543,577  9/1985  Tachibana et al. ................. 367/901

OTHER PUBLICATIONS

Stremler, Introduction to Communication Systems, 12-1982, pp. 231-232.

Primary Examiner—Thomas H. Tarcza
Assistant Examiner—Daniel T. Pihulic
Attorney, Agent, or Firm—Michael J. McGowan; Prithvi C. Lall

[57] ABSTRACT

In combination with any signal processor system which uses an R-C integrator type energy detector to recognize the presence of electrical signals such as those that are proportional to a received acoustic ping signal, the turnaround time stability improvement comprising a timing initiation signal recognition means, a validation means, first and second one-shorts for A/D conversion, and AND gate means for receiving the timing initiation signal and the validation signal and outputting a valid ping timing signal only when both are true, said valid ping timing signal in turn causing subsequent actions normally initiated by this event to occur, such as a transponder system incorporation the present invention projecting a return ping into the water.

6 Claims, 4 Drawing Sheets

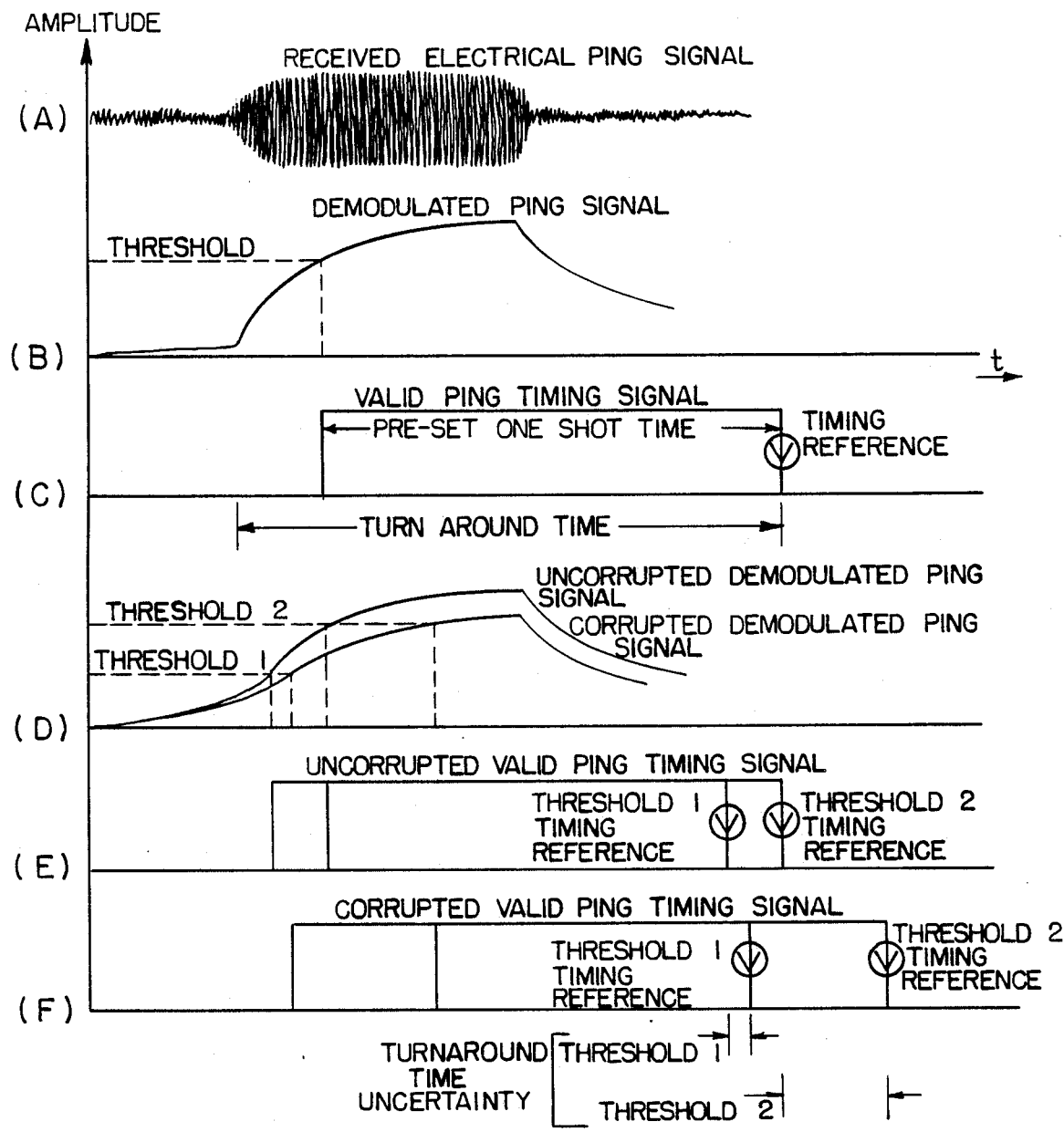
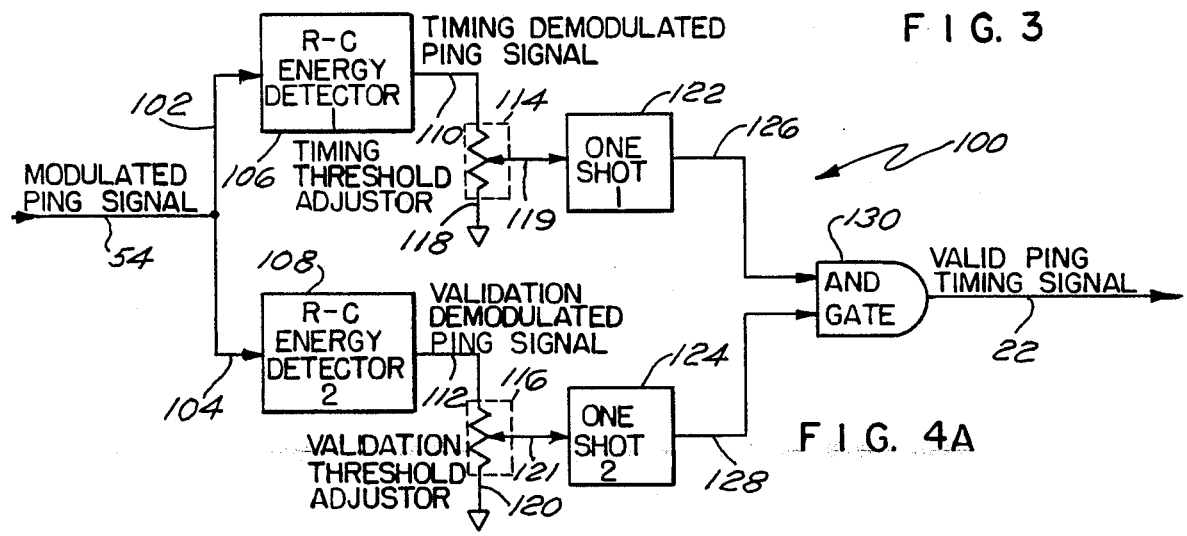
FIG. 3
FIG. 4A

MEANS FOR IMPROVING TURNAROUND TIME STABILITY FOR R-C ENERGY DETECTORS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to signal processing means for providing improved turnaround time stability and more particularly to a means for improving the turnaround time stability of certain R-C energy detector based signal processors with respect to doppler and signal to noise ratio effects while minimizing the false alarm rate.

(2) Description of the Prior Art

The present invention is used in conjunction with a signal processing subsystem of an energy detector system. The subsystem employs an R-C integrator type energy detector for recognition of the presence of electrical signals and for timing of subsequent actions which are initiated upon receipt of such signals. In order to illustrate a typical energy detector or system and a signal processing subsystem, an exemplary prior art acoustic transponder system is described below.

Acoustic transponder system 10 is presented in block diagram form in FIG. 1. In use, one or more of these transponders 10 are tethered to the ocean floor in a preselected configuration as part of an acoustic tracking system. This acoustic tracking system also includes a plurality of separate acoustic receivers arranged in a preselected pattern, the output of which is used by general purpose digital computers for range and bearing determinations. A vessel being monitored by the tracking system transmits acoustic pings at regular intervals, which pings are received at one or more acoustic transponder systems 10. Each acoustic ping is converted by the transducer section 12 of transponder system 10 into an analog electrical ping signal 14 which is then transmitted to and through a transmit/receive network 16, emerging as ping signal 18. Ping signal 18 is transmitted to signal processor 20 which separates the ping from interfering background disturbances and provides as output a valid digital ping timing signal 22. At some constant preselected time after the valid ping is recognized by signal processor 20, a digital timing signal is sent to a transmitter circuit via control logic circuit 24, and output connections 26 and 28. This timing signal causes transmitter circuit 30 to initiate a ping transmission signal 32 via network 16 to acoustic transducer 12 which projects a ping back into the water. Transmit/receive switch network 16 senses the signal flow direction and switches acoustic transducer 12 into a receiver mode or a projector mode as appropriate. Output connection 28 from control logic 24 divides into output 28a to signal processor 20 and output 28b to transmitter circuit 30. Outputs 28a and 28b serve to lockout device 20 while device 30 is operating and vice versa.

Thus, each successfully recognized "valid" ping causes transponder system 10 to reply with a corresponding ping to at least one separate acoustic receiver in the tracking system. The precise time at which each ping is transmitted by the vessel being tracked is carefully controlled by the tracking system. Range information is then deduced from transmit time, range geometry and the reply ping arrival time using a computer. Any uncertainty introduced in this arrival reply ping time will directly translate into uncertainties in the tracking solution. As used herein "uncertainty" refers to the timing reference period which ideally should be held constant.

A typical signal processor 20 used in transponder system 10 is illustrated in FIG. 2. Signal processor 20 further comprises a lockout switch 34 which is controlled by output 28a from control logic unit 24 of FIG. 1. When transponder system 10 is in receive mode, switch 34 is closed permitting received electrical ping signal 18 pass into processor 20 for signal conditioning in amplifier/clipper 40, output 42 of which is filtered by wideband bandpass filter 44. The filtered output signal 46 from filter 44 is next passed through a second amplifier/clipper 48, emerging as signal 50. Signal 50 is then fed to narrowband filter 52, emerging as modulated ping signal 54. Modulated ping signal 54 is demodulated by R-C energy detector 56 and as demodulated ping signal 58 is inputed to validation threshold adjustor 60, adjustor 60 being set, as a voltage divider referenced to ground 62. This assures that an amplitude large enough to be a valid ping will trigger one shot 64 which produces a digital timing pulse 22 indicative of a valid ping signal having been received.

FIG. 3 graphically depicts the timing signals for the processor of FIG. 2, the component numbers thereof being used in conjunction with the FIG. 3 discussion. Each received electrical ping signal, such as that shown in FIG. 3A, is a short continuous wave (CW) burst of constant amplitude and frequency. The ping signal energy is proportional to $[\text{Voltage (V)}]^2 \times [\text{time (t)}]$. Normally this signal is embedded in background interference and exhibits a shifted center frequency due to the speed of the tracked vessel, i.e., doppler shift. This signal is amplified/clipped, 40, and then applied to wideband bandpass filter 44 to remove some of the background interference. The signal is next amplified/clipped again, 48, and applied to narrowband bandpass filter 52. Enough of the interference is removed at this point to enable the signal to be recognized by R-C energy detector 56. Typically an R-C energy detector comprises a rectifier and an R-C integrator. Energy from the rectified ping signal charges the integrator capacitor (C) through a resistor (R) resulting in the demodulated ping signal shown in FIG. 3B. When the demodulated ping signal exceeds a preset threshold amplitude, one shot 64 is triggered causing the valid ping timing signal to be issued to transmitter circuit 30 previously described. The signal processor "turnaround time" shown in FIG. 3C represents the time interval between the beginning of the received electrical ping signal and the digital timing reference trailing edge of the valid ping timing signal from one shot 64. The valid ping timing signal pulse itself is a constant preset one shot time period. Uncertainties in the variable portion of the turnaround time, from the beginning of the received electrical signal to the one shot threshold, directly affect the reply ping arrival times at the separate acoustic receivers and thus introduce errors into the range tracking solution for the vessel.

Contradictory considerations effect the one shot threshold settings shown in FIGS. 3B and 3D. Since some interference always remains embedded in the demodulated ping signal, it is desirable to raise the threshold to a voltage level sufficient to prevent the interference from producing a valid ping timing signal in the absence of a true ping, i.e., a false alarm. However, it is also desirable to set this threshold voltage level as low as possible to minimize the turnaround time uncertainty caused by differences in the demodulated ping signal amplitudes of different pings as shown in FIG. 3D. Corrupted and uncorrupted demodulated ping signals are shown to illustrate the effect of curve slope on the time measurements at constant threshold voltage settings Threshold 1 and Threshold 2 of FIG. 3D. These time differences are caused by varying degrees of amplitude signal-to-noise ratio and doppler shift as the vessel moves about the range. FIGS. 3D-3F illustrate the latter signal variation condition. Threshold 2 corresponds to a higher voltage and hence an optimum false alarm rate setting while Threshold 1 corresponds to a shorter time slice at more favorable segment of the amplitude curve for timing and hence a reduced turnaround time uncertainty, t. Turnaround time uncertainty versus demodulated ping signal amplitude for the conditions of threshold 1 and threshold 2 is illustrated in FIG. 3F. The optimum uncertainty would be zero, but the smaller the t is the better. Setting threshold 1 lower takes advantage of the steeper slope portion of each successive ping curve.

SUMMARY OF THE INVENTION

Accordingly, it is a general purpose and object of the present invention to provide a means for producing signal processor turnaround times of constant duration.

It is a further object that such turnaround time governing means work with R-C integrator type energy detectors.

Another object is that such device function over a wide range of signal-to-noise ratios and doppler shifts effects.

Still another object is that such device employ one-shots for analog-to-digital conversion.

These objects are accomplished with the present invention by providing in combination with any signal processor system which uses an R-C integrator type energy detector to recognize the presence of electrical signals such as those that are proportional to a received acoustic ping signal, the turnaround time stability improvement comprising a timing initiation signal recognition means, a validation means, first and second one-shots for A D conversion, and AND gate means for receiving the timing initiation signal and the validation signal and outputting a valid ping timing signal only when both are true, said valid ping timing signal in turn causing subsequent actions normally initiated by this event to occur, such as a transponder system incorporating the present invention projecting a return ping into the water.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 3, curves A-F, show graphical representations of the electrical signal processing stages of the signal processor of FIG. 2.

FIGS. 4A and 4B show alternate embodiments of the turnaround time improvement means of the present invention.

DESCRIPTION OF THE PREFERRED EMBODIMENT

Figure 2:
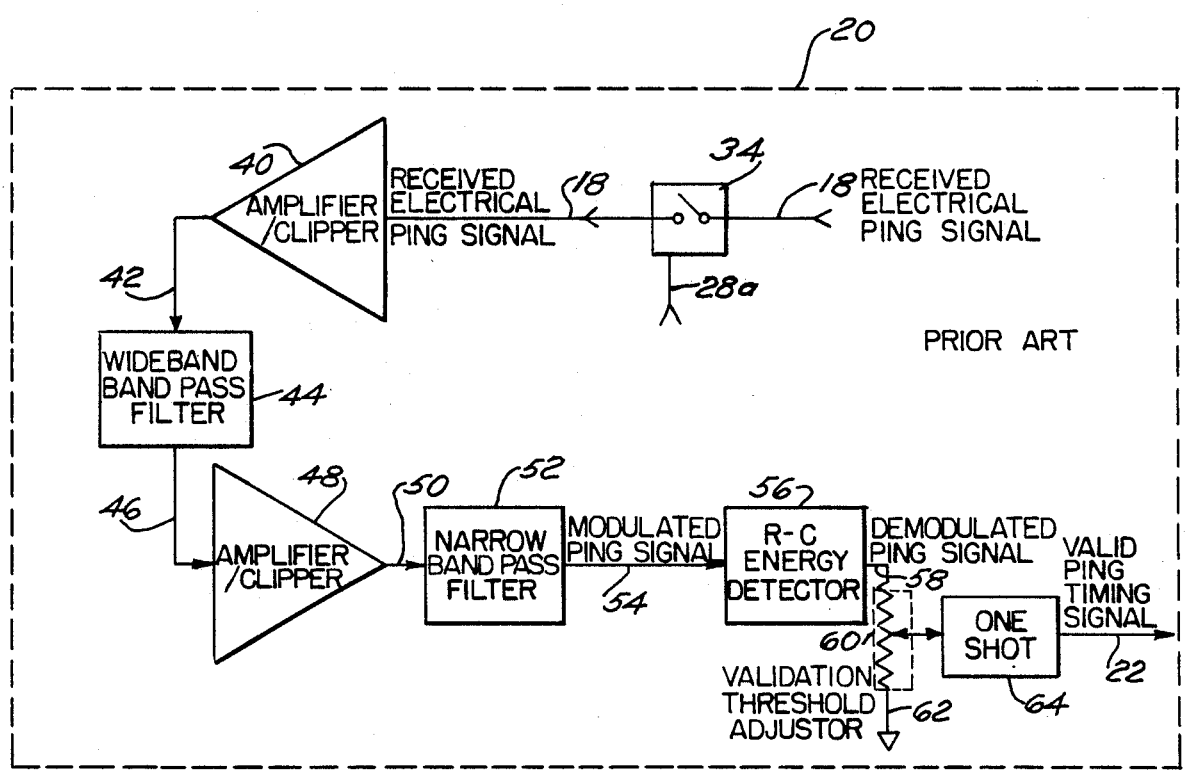
FIG. 2 shows a block diagram of the signal processor functional block of the transponder device of FIG. 1.
Figure 4B:
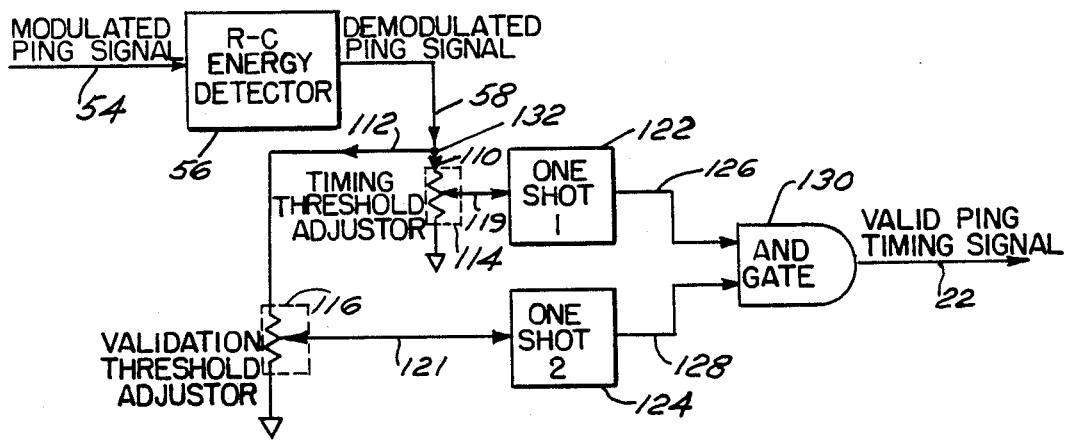

Referring now to FIGS. 4A and 4B there is shown alternate embodiments of R-C energy detector signal processor improvement means, each of which virtually eliminate the prior art tradeoff between threshold settings for optimum false alarm rate and turnaround time uncertainty. FIG. 4A shows one embodiment of the turnaround time improvement means of the present invention. The modulated ping signal 54 of FIG. 2 is simultaneously provided as signals 102 and 104 to each of two detection paths. Signal 102 enters the timing threshold leg while signal 104 enters the parallel validation threshold leg. Signals 102 and 104 are processed by R-C energy detectors 106 and 108 emerging as timing demodulated ping signal 110 and validation demodulated ping signal 112, respectively. Signals 110 and 112 then pass through timing threshold adjustor 114 and validation threshold adjustor 116, respectively. Adjustor 114 is a voltage divider with ground reference 118 while adjustor 116 is a voltage divider with ground reference 120. The outputs of adjustors 114 and 116 are signals 119 and 121 respectively which connect to one shot 1, 122 and one shot 2, 124, respectively producing digital signals along conductors 126 and 128 at preset trigger levels. Conductors 126 and 128 are each connected to AND gate 130 and when both carry a logical true pulse, valid ping timing signal 22 is issued. In FIG. 4A each independent combination of an R-C energy detector, a threshold adjustor and a one shot process the modulated ping signal independently as previously described in FIG. 2. FIGS. 5A-F illustrate the timing signals for FIG. 4 and will be referred to concurrently in the discussion. Timing threshold adjustor 114 of FIG. 4A establishes the timing threshold of FIG. 5B which is preselected to be optimum with regard to turnaround time uncertainty. Similarly, validation threshold adjustor 116 of FIG. 4A establishes the validation threshold of FIG. 5C which is preselected to be optimum with regard to false alarm rate. When R-C energy detectors 106 and 108 are identical, the "timing" pulse from one shot 122 will always precede the "validation" pulse of one shot 124 as shown in FIGS. 5D and E. When the output pulses of one shot 1 and one shot 2 are AND gated, valid ping timing signal 22 appears as shown in FIG. 5F. As in the prior art signal processor, subsequent transponder 10 activity begins on the timing reference of the valid ping time signal. In the present invention however, the timing reference is based upon the timing threshold setting but it is not transmitted unless the validation threshold is exceeded during the pulse time of one shot 1.

Because both R-C energy detectors are identical, only a single detector may needed as illustrated in FIG. 4B provided the R-C energy detector used is one which permits two threshold output settings. Some R-C energy detector designs however cannot separate their threshold adjustors in a way that accommodates two thresholded outputs. In such cases, separate energy detectors are required as shown in FIG. 4A. Using separate energy detectors also allows choice of two different integration time constants to further optimize overall performance. When different time constants are used, the pulse width for one shot 2, FIG. 5E, must be chosen such that the pulse does not expire before expiration of the pulse of one shot 1.

Figure 1:
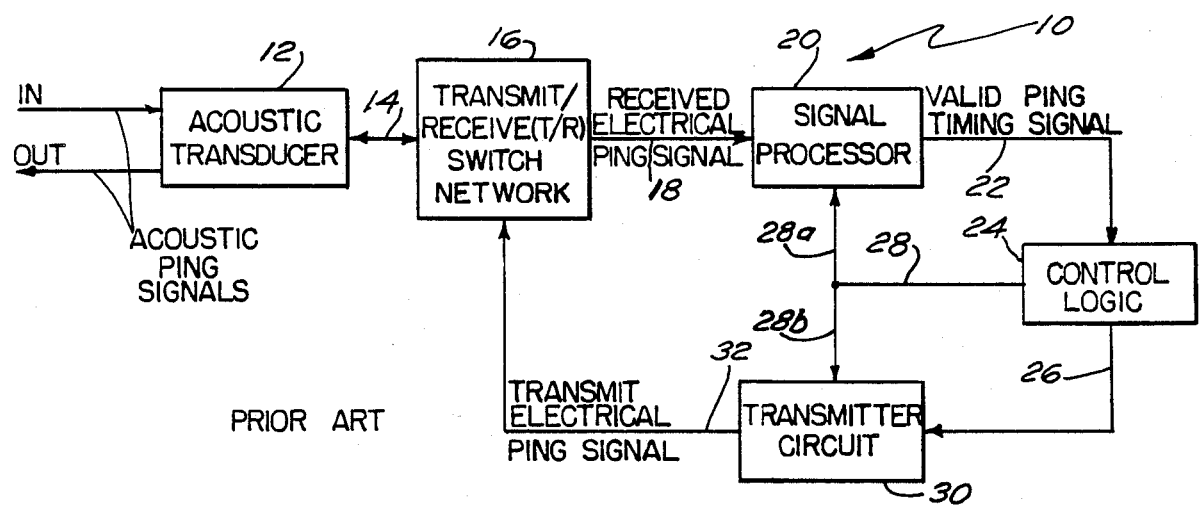
FIG. 1 shows a block diagram of a typical transponder for a range tracking system.
Figure 6:
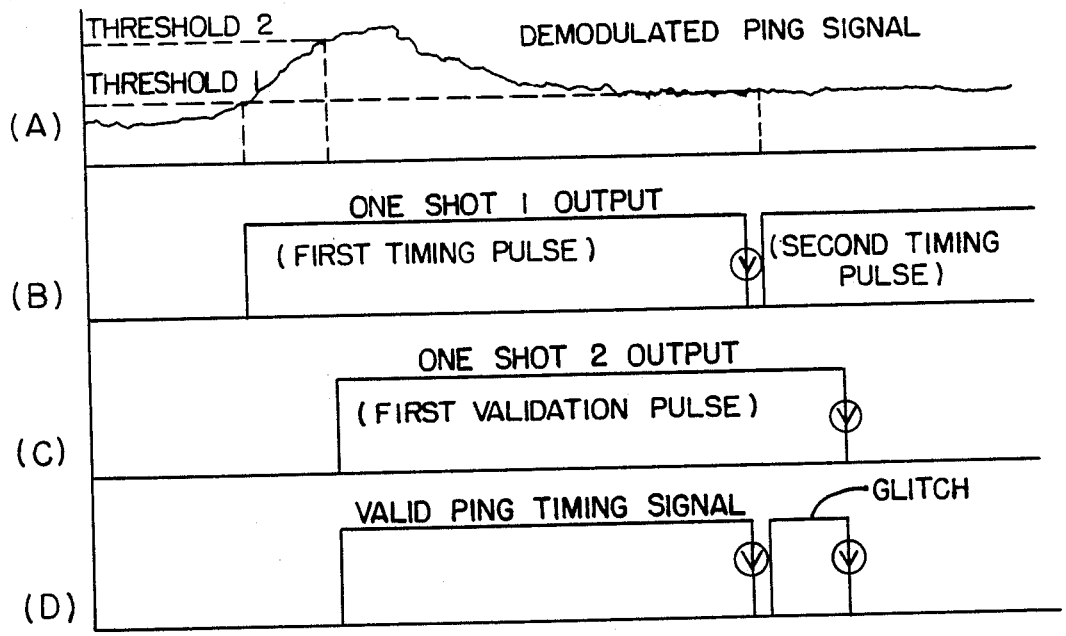
FIGS. 6A-D show the timing sequence diagrams which explain the lock-out feature of the transponder system.

There may be instances where the false alarm rate degrades somewhat if the timing threshold is set too close to the noise floor of the demodulated ping signal of FIG. 6A. FIGS. 6A-D illustrate such an instance using the circuits in FIGS. 4A or 4B. In this case, interference at or above threshold 1 causes one shot 1 to trigger again, FIG. 6B, before the one shot 2 pulse, FIG. 6C, has expired. The second one shot 1 pulse causes a glitch to appear in the valid ping timing signal, FIG. 6D, which adds an erroneous timing reference. Most transponders, however, incorporate lockout circuits such as 28a and 28b of FIG. 1 in their control logic so as to use the first timing reference to ignore all subsequent signal processor activity for a preset period of time so as to allow the transponder to generate a reply ping. Glitches like the one previously described are thus ignored. Setting the timing threshold too close to the noise floor will also increase the false alarm rate by increasing the probability that one shot 1 will have been triggered by interference just prior to the occurrence of a valid ping where one shot 2 will trigger.

Figure 5:
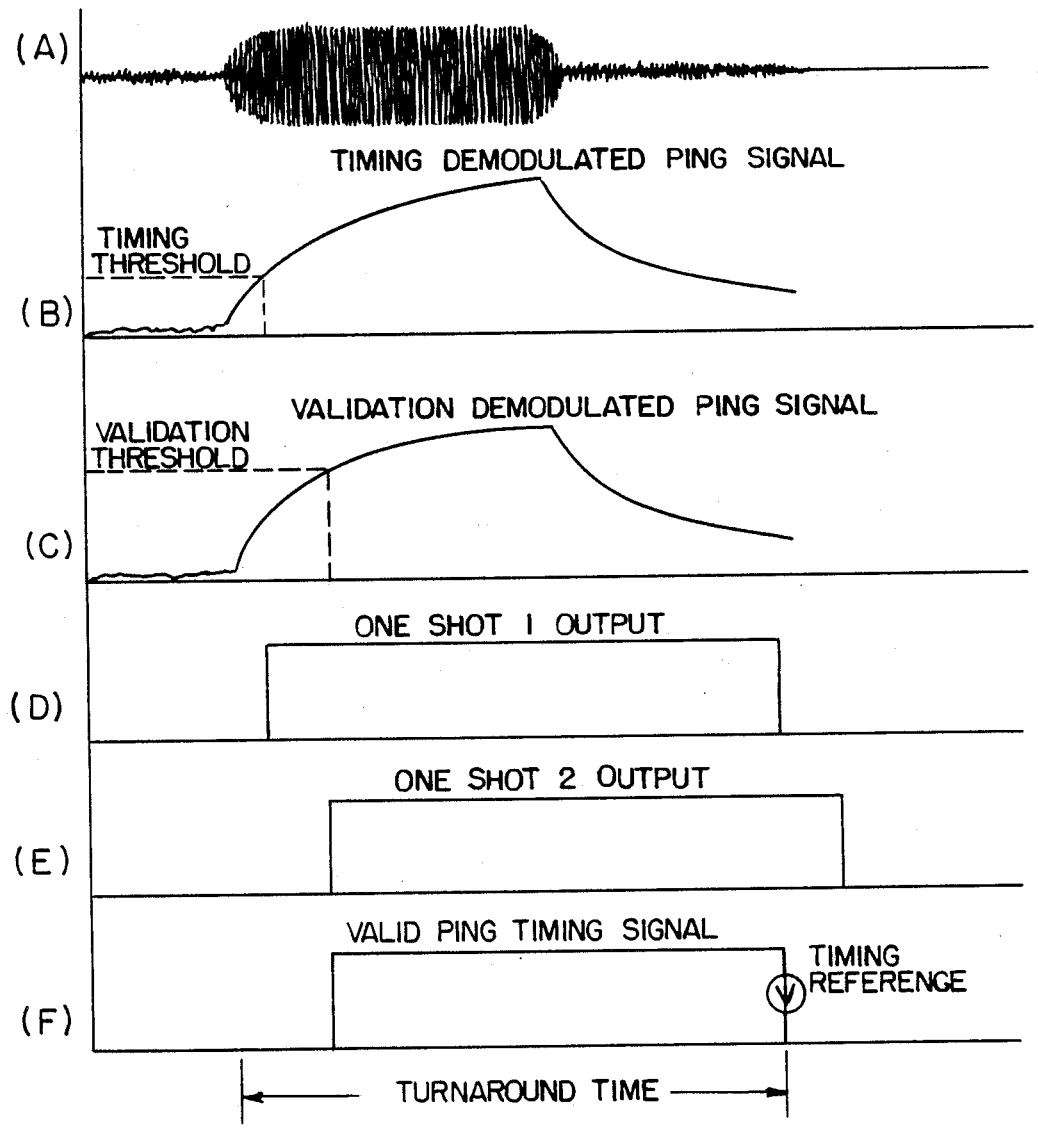
FIGS. 5A-F show graphical representations of the electrical signal processing stages of the transponder after the improvement of the present invention.
Figure 7:
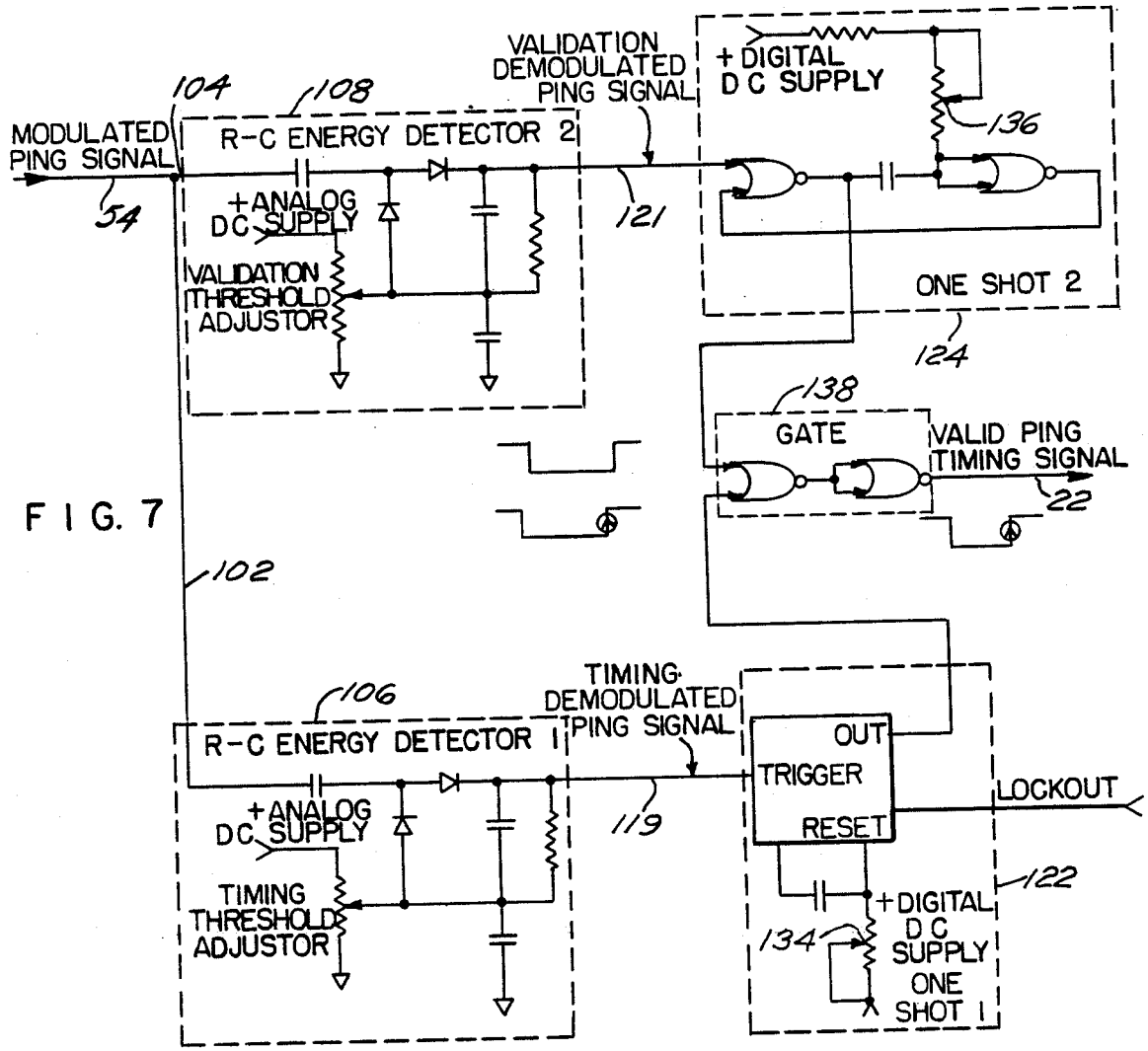
FIG. 7 shows a typical circuit diagram for the block diagram of FIG. 4A.

An experimental prototype circuit which has successfully demonstrated the present invention appears in FIG. 7. Each R-C energy detector comprises a rectifier and an R-C integrator. Energy from the rectified ping signal charges the integrator capacitor (C) through a resistor (R) resulting in the demodulated and threshold adjusted ping signals 119 and 121 shown in FIG. 7. When the demodulated and threshold adjusted ping signals exceed preset thresholds, one shots 1 and 2 are triggered causing the valid ping timing signal to be issued to the transmitter circuit as previously described. One shot 1 and one shot 2 of FIG. 7 develop pulses of constant duration. These durations are determined by their R-C time constants. Adjustable resistors, i.e., trim pots 134 and 136, are used to set these time durations such that they are consistent with the desired performance requirements of the circuit. Two different realizations of one shots 1 and 2 are shown in FIG. 7. Either realization may be used for the present invention, however the realization shown for one shot 2 permits a convenient implementation of lockout function 28a and switch 34 as shown in FIG. 2. In addition, active low signals were used in the prototype circuit. For this reason an OR gate based device 138 was used to implement the AND gate function shown in FIGS. 4A and 4B. Instead of a high to low timing reference transition as shown in FIG. 5, a low to high transition was used to establish the timing reference in FIG. 7. Both implementations, however, are functionally equivalent.

The advantages of the present invention over the prior art are that this invention makes the type of acoustic energy detector system described above less turnaround time sensitive to doppler and signal-to-noise ratio effects. It does this without sacrificing false alarm rejection performance. It differs from the conventional prior art energy detector in that the turnaround timing reference is established based upon a more favorable portion of the processed signal waveform for timing than the conventional energy detector does. It uses the same portion of the processed signal waveform as the conventional detector for determining processor sensitivity (recognition).

What has thus been described is, in combination with any signal processor system which uses an R-C integrator type energy detector to recognize the presence of electrical signals such as those that are proportional to a received acoustic ping signal, the turnaround time stability improvement comprising a timing initiation signal recognition means, a validation means, first and second one-shots for A D conversion, and AND gate means for receiving the timing initiation signal and the validation signal and outputting a valid ping timing signal only when both are true, said valid ping timing signal in turn causing subsequent actions normally initiated by this event to occur, such as a transponder system incorporating the present invention projecting a return ping into the water.

Obviously many modifications and variations of the present invention may become apparent in light of the above teachings. For example: This invention is not restricted to the experimental prototype circuit design shown in FIG. 7. Nor is the invention restricted to use in transponders. Any application, acoustic or non-acoustic (such as RF), that uses this form of energy detection for precise timing reference can also employ this invention. Each of the individual functional blocks shown in FIG. 4 may be implemented by a broad variety of well known digital or analog circuit designs.

In light of the above, it is therefore understood that within the scope of the appended claims, the invention may be practiced otherwise than as specifically described.

What is claimed is:

1. A signal processing device, having a stable turnaround time response period, comprising:

R-C energy detection means, for receiving a modulated analog electric signal and producing a digital timing threshold signal pulse and a later in time digital validation threshold signal pulse therefrom, said R-C energy detection means further comprising, a first R-C energy detector, for receiving said modulated analog electric signal and producing a timing demodulated analog electric signal therefrom, a second R-C energy detector, for receiving said modulated analog electric signal and producing a validation demodulated analog electric signal identical to said timing demodulated analog electrical therefrom, a timing threshold adjustor, connected to said first R-C energy detector, for receiving said timing demodulated analog electric signal therefrom and passing therethrough only a preselected portion of said analog timing demodulated signal, said timing adjustor being of a grounded voltage divider type, a validation threshold adjustor, connected to said second R-C energy detector, for receiving said validation demodulated analog electric signal therefrom and passing therethrough only a preselected portion of said analog validation demodulated signal, said validation adjustor being of a grounded voltage divider type, a first one shot, connected to said timing threshold adjustor, for receiving said analog timing demodulated signal portion therefrom and producing said digital timing threshold pulse only if said analog timing signal reaches a preset level, and a second one shot, connected to said validation threshold adjustor, for receiving said analog validation demodulated signal portion therefrom and producing said digital validation threshold pulse only if said analog validation signal reaches a preset level; and AND gate means, conductively connected to said R-C energy detection means, for receiving said digital timing threshold pulse signal and said later digital validation threshold pulse signal from said R-C energy detection means, said AND gate means producing a digital, valid timing pulse signal therefrom at the instant both signals are present concurrently thereby ensuring that the turnaround time is always based on the timing threshold signal duration triggered by the validation threshold signal.

2. A device according to claim 1 wherein said R-C energy detection means further comprises:
   an R-C energy detector, for receiving modulated analog electric signal and producing a demodulated analog electric signal therefrom;
   a timing threshold adjustor, connected to said R-C energy detector, for receiving said demodulated analog electric signal therefrom and passing therethrough only a preselected portion of said analog demodulated signal, said timing adjustor being of a grounded voltage divider type;
   a validation threshold adjustor, connected to said R-C energy detector, for receiving said demodulated analog electric signal therefrom and passing therethrough only a preselected portion of said analog demodulated signal, said validation adjustor being of a grounded voltage divider type;
   a first one shot, connected to said timing threshold adjustor, for receiving said analog timing demodulated signal portion therefrom and producing said digital timing threshold pulse only if said analog timing signal reaches a preset level; and
   a second one shot, connected to said validation threshold adjustor, for receiving said analog validation demodulated signal portion therefrom and producing said digital validation threshold pulse only if said analog validation signal reaches a preset level.

3. A device according to claim 1 wherein said AND gate means further comprises an AND gate.

4. A device according to claim 1 wherein said AND gate means further comprises first and second OR gates connected in series.

5. A device according to claim 2 wherein said AND gate means further comprises an AND gate.

6. A device according to claim 2 wherein said AND gate means further comprises first and second OR gates connected in series.

* * * * *